United States Patent [19]
Dinger et al.

[11] Patent Number: 5,406,454
[45] Date of Patent: Apr. 11, 1995

[54] MICROELECTRONIC DEVICE POSITIONING MEANS

[75] Inventors: Rudolf Dinger, St-Aubin; Jean-Luc Simon, Marin, both of Switzerland

[73] Assignee: Asulab S.A., Bienne, Switzerland

[21] Appl. No.: 50,889

[22] Filed: Apr. 21, 1993

[30] Foreign Application Priority Data

Apr. 21, 1992 [FR] France .................. 92 04976

[51] Int. Cl.⁶ .............................................. H05K 1/02
[52] U.S. Cl. ..................... 361/752; 361/802; 361/748
[58] Field of Search ............. 361/752, 748, 758, 756, 361/759, 801, 802

[56] References Cited
U.S. PATENT DOCUMENTS

| | | | |
|---|---|---|---|
| 4,097,894 | 6/1978 | Tanner et al. | 358/118 |
| 5,264,990 | 11/1993 | Venambre | 361/761 |
| 5,276,278 | 1/1994 | Lin | 174/52.1 |
| 5,296,692 | 3/1994 | Shino | 235/486 |

FOREIGN PATENT DOCUMENTS 0456285 11/1991 European Pat. Off. .

OTHER PUBLICATIONS

Automotive Engineering, vol. 99, No. 9, (Sep. 1991) Warrendale, Pa. U.S., p. 60 "Micromachined Accelerometers".

Primary Examiner—Leo P. Picard
Assistant Examiner—L. Thomas
Attorney, Agent, or Firm—Weil, Gotshal & Manges

[57] ABSTRACT

The invention concerns a microelectronic device having body (42) and abutment device (46, 47, 48) projecting from one face of the body (42) for abutment of the microelectronic device to a support member (62), the body (42) including an electrically active region (41) with a sensitive axis (51), characterised in that the abutment device (46, 47, 48) has a predetermined relationship with the sensitive axis (51) to thereby enable alignment of the sensitive axis (51) with an expected signal axis.

13 Claims, 3 Drawing Sheets

MICROELECTRONIC DEVICE POSITIONING MEANS

The present invention relates generally to means for positioning a microelectronic device, and in particular for positioning a microelectronic device having an electrically active region. The invention also relates to a mounting assembly for use with one or more such microlectronic devices. The invention is suitable for use in fixing the mechanical orientation and alignment of an electrically active region having a sensitive axis, and it will be convenient to disclose the invention in relation to that exemplary application. It is to be appreciated, however, that the invention is not limited to that application.

The technology of constructing and utilizing electronic circuits and devices in extremely small packages by using integrated circuit manufacturing techniques is used today in a range of consumer products, such as hand-held calculators and electronic watches. Microelectronic devices which have been manufactured using such techniques include, but are not limited to, integrated circuits known as monolithic IC's (integrated circuit), and thin and thick-film IC's. Electrical circuit components such as transistors, resistors, capacitors, inductors, and conductors are either diffused into a single block of material, such as silicon, or are deposited onto a substrate such as a ceramic.

Applications of such technology have resulted in microelectronic devices with particular electrical properties such as bipolar junction transistors (BJT) field-effect transistors (FET) and metal-oxide semiconductor FET's. Previously it has been posssible to consider the operation of these microelectronic devices purely in terms of their internal electrical properties. For example, the application of current to the base of a transistor diffused into a block of silicon may then cause current to flow between the collector and the emitter of the transistor. This operation can occur without reference to the mechanical orientation, or to other mechnical properties, of the device itself.

However, there now exist microelectronic devices for which these mechanical properties are important. Devices made by utilizing the technology of micromachining are examples of such. The development of this technology has allowed silicon to be made into microelectronic devices having micromechanisms almost as small as the electronic ones. Chemical etching techniques are used for forming three dimensional shapes such as pits, holes, trenches, cantilevers and diaphrams. Micromachining technology has been used to build valves, springs, nozzles, connectors, printer heads, circuit boards, leaf springs and sensors for properties such as force, pressure, acceleration and chemical condensation.

An accelerometer is one example of an integrated silicon sensor. In one particular arrangement, an oxide beam is suspended over a shallow well formed of such a device by a boron etch-stop technique. A metal layer is deposited on the top surface of the oxide cantilever. The metal layer and the flat silicon on the bottom of the well act as two plates of a variable air gap capacitor. If the silicon chip is suddenly moved, the inertia of the gold weight causes the beam to flex, changing the air gap and hence the capacitance. The output of the sensor is a voltage proportional to acceleration.

One application of such an accelerometer is in the automotive field, in which microelectronic devices have been used for automatic airbag deployment. When an automobile rapidly impacts another object, the resultant change in output voltage from the accelerometer is used to inflate an airbag, thereby protecting the passengers from injury.

In order that the airbag deploy only when more than a predetermined level of acceleration or deccelleration is detected in the appropriate direction, the accelerometer must be correctly aligned. Its sensitive axis, in this case the axis that is most sensitive to changes in acceleration, must be aligned with the expected acceleration axis so that the expected electrical and mechanical properties of the accelerometer can be practically realized in the proper inflation of the airbag.

However, as the microelectronic device utilized in such an accelerometer is extremely small, such alignment is difficult and may require assembly using optical means to examine the pattern of the micromechanism on the accelerometer and align the chip containing the microelectronic device with a support member. Such techniques are complex and costly, and add considerably to the cost of production and difficulties involved in the manufacture of such devices. As will be well understood by those skilled in the art, such problems are inherent to many microelectronic devices having an electrically active region with a sensitive axis requiring accurate positioning and are not limited merely to the particular devices thus far described.

It is an object of the present invention to provide a means for positioning a microelectronic device which alleviates the disavantages of the prior art.

It is a further object of the present invention to provide means for accurately positioning a microelectronic device having an electrically active region with a sensitive axis, without the attendant technical complexities of the prior art.

It is another object of the present invention to provide a convenient mounting assembly for use with such microelectronic devices.

With these objects in mind, the present invention provides a microelectronic device having body and abutment means for abutment of said microelectronic device to a support member, said body including an electrically active region with a sensitive axis, characterised in that said abutment means has a predetermined relationship with said sensitive axis to thereby enable alignment of said sensitive axis with an expected signal axis.

As indicated above, the microelectronic device may be a device manufactured according to, but not limited to, techniques utilized in the production of integrated circuits. Circuit elements may be diffused into or deposited onto a substrate, rather than assembled by conventional mechanical production techniques. In particular the microelectronic device may be made using a flat sheet of silicon, or other suitable substrate, impregnated with impurities in a pattern to form an array of transistors and resistors with electrical inteconnections made by depositing thin layers of gold or aluminium thereupon. A product containing such a microelectronic device may nevertheless be mounted or connected to a base or further circuit elements by conventional mechanical means, as provided by the connection of wires between the metalization contacts of a mircroelectronic device and the pins of a commercial integrated circuit can.

The electrically active region includes those regions of the microelectronic device having an electrical function, and may include transistors, resistors, capacitors, inductors, electromagnetic coils and other circuit elements. An electrical signal may be provided by the electrically active region in response to an external force or signal. Such an external force or signal may be electrical, electromagnetic or mechanical in nature.

The electrical signal provided in response to an external force may vary in strength depending upon the mechanical orientation of the electrically active region with respect to the direction of the external force or signal. The maximum strength of this electrical response of the electrically active region may be found when the electrically active region is oriented along a sensitive axis.

The microelectronic device may be oriented to thereby enable alignment of the sensitive axis of the electrically active region with the expected external signal direction, by the abutment of the microelectronic device to a support member. The relationship between the abutment means and the sensitive axis of the electrically active region is determined prior to the alignment of the sensitive axis with the expected external signal direction. Similarly, the support member and the expected signal axis may be aligned prior to the abutment of the microelectronic device.

In one embodiment of the invention, the microelectronic device may be understood as comprising a body and abutment means integral therewith. The abutment means may be fabricated directly onto the body, and not fabricated separately prior to connection to the body. The abutment means may be deposited onto the body and may be further predominantly metallic in composition. Such metalisation techniques as are known to those skilled in the art may be used to achieve such deposition.

In one embodiment of the invention, abutment means comprises a plurality of projections from the body. The microelectronic device may be correctly positioned with respect to the support member by causing said plurality of projections to abut a positioning surface, thereby fixing the mechanical orientation of the microelectronic device.

In one embodiment of the present invention, abutment means are positioned on the body by means of a mask applied to the body. The mask may include means to allow the deposition of abutment means onto the body. The mask may include means to align the mask with the sensitive axis of the electrically active region of the body, such as alignment marks on the mask. Preferably alignement means are deposited on the body after the mask has been aligned with the sensitive axis of tile electrically active region of the body.

In one embodiment of the present invention, one or more microelectronic devices are mounted in a mounting assembly. The mounting assembly includes a support member for engagement with the one or more microelectronic devices thus mounted. The support member may include a reference face for engagement with one face of the one or more microelectronic devices. Each one of the one or more microelectronic devices may be firstly fixedly positioned along one axis by this engagement. The support member may also include an abutment surface for engagement with the abutment means of a microlectronic device. The microelectronic device may thus be fixedly positioned along another axis by a relative sliding movement between the reference surface and the abutment means, to thereby enable the engagement between the abutment means and the abutment surface.

In another embodiment of the invention, the mounting assembly includes an additional abutment surface for engagement with the abutment means for a microelectronic device. The microelectronic device may thus be fixedly positioned along a third axis. This may be particurlarly useful for devices requiring a precise mechanical orientation not only with respect to a sensitive axis, but with respect to a given point along that axis. The microelectronic device may in that manner be precisely positioned along all axes with respect to the mounting assembly. Preferably, the two abutment surfaces are arranged perpendicularly to each other and to the reference surface of the support member.

Other advantages and characteristics of the invention will appear from the following description of exemplary embodiments of the invention, in conjuction with the drawings in which:

It will be appreciated that the microelectronic device, the positioning means and the mounting assembly of the present invention are not limited to the prefered embodiments illustrated.

Figure 1:
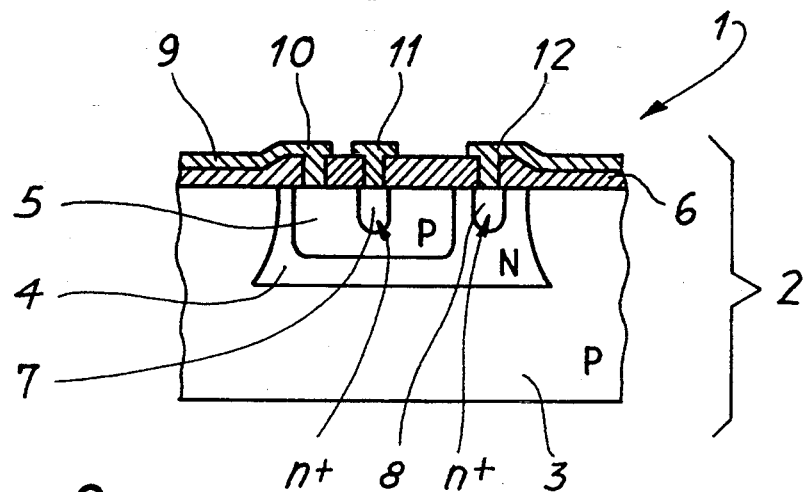
FIG. 1 is a diagrammatic cross-sectional view of a portion of a microelectronic device according to the present invention.

Referring to FIG. 1, there is shown generally a cross-section of a portion of microelectronic device 1 (abutment means is not shown, but is to be understood as comprising part of microelectronic device 1). By the process of the application of oxidization, photoresist, mask and ultra-violet light, as will be well understood by those skilled in the art, a transistor comprising layer 5 (base), region 7 (emitter) and region 8 (collector) is diffused into epitaxial layer 4 of n-type silicon, grown on substrate 3 of p-type silicon, of body 2 of micorlectronic device 1. To provide connection to the diffused region, metallic material 9 is deposited onto silicondioxide layer 6, and unwanted areas are etched away to leave aluminium contacts 10, 11 and 12. The repetition and extension of this principle results in the production of an integrated circuit. It is to be appreciated however that this is but one example of a portion of a microelectronic device, the subject of the present invention, and that many other ways of creating a microelectronic device with an electrically active region exist.

Figure 2:
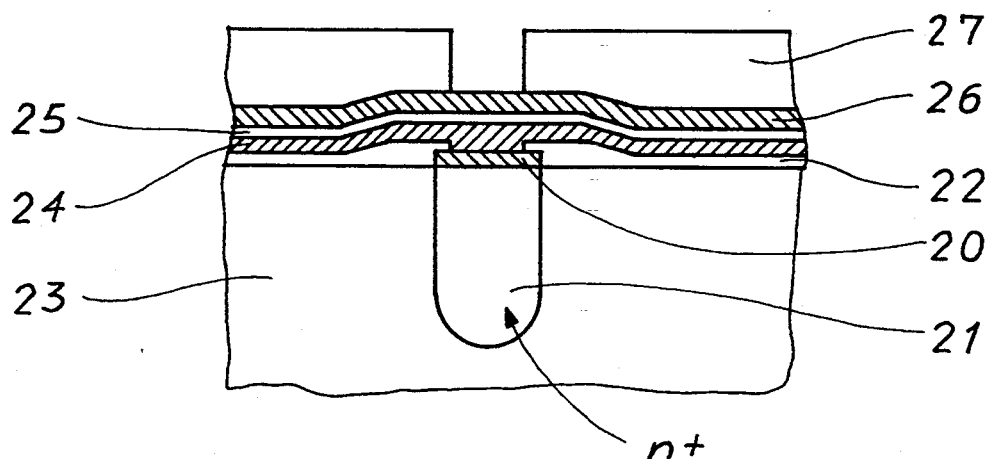
FIG. 2 is a diagrammatic cross-sectional view of the device of FIG. 1.

In order that aluminium contacts 10, 11 and 12 may more easily be connected to conductors, metallic projections may be deposited there upon. Referring now to FIG. 2, there is shown aluminium contact 20 connected to emitter region 21. Silicon dioxide layer 22 is then deposited on the surface of integrated circuit 23 and utilizing the etching process as explained above and well understood by those skilled in the art, is subsequent removed from an area directly above aluminium contact 20. A layer 24 of Titanium-tungstan is deposited on the surface of integrated circuit 23, followed by a layer 25 of metallic material, usually nickel or gold. A photoresist is then applied to the layer 25 of gold, and a mask 26 on top of that with a correctly positioned aperture 27 over aluminium contact 20. The integrated circuit is then exposed to ultra-violet light and photoresist 26 becomes polymerized, so that the portion over gold layer 25 may be subsequently dissolved and removed.

Figure 3:
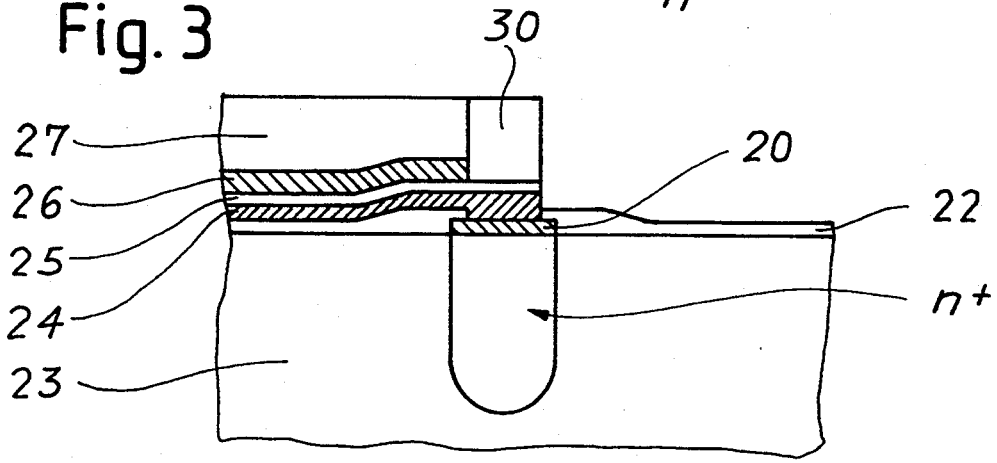
FIG. 3 is a further diagrammatic cross-sectional view of the device of FIG. 1.

Referring to FIG. 3, there is shown the integrated circuit 23 of FIG. 2. Following the state just described, a contact is applied to Titanium-tungstan layer 24 and integrated circuit 23 is placed in a galvanic bath (not shown) so that gold bump 30 may by grown above aluminium contact 20. Gold bump 30 is grown to a height of less than 30 $\mu$m, and normally approximately 25 $\mu$m ($\pm 1$ $\mu$m), for security of connection and for mechanical stability. Integrated circuit 23 is then placed in a photoresist-stripping bath (not shown) to remove layers 24, 25, 26 and 27 (as shown to the right of gold bump 30). It should be emphasized that the foregoing is but one example of the method of construction of a microelectronic device having an electrically active region and is described to illustrate the manner is which gold bumps in particular and other projections in generally, may be applied to the body of a microelectronic device.

Such gold bumps have a predetermined relationship with the electrically active region of microelectronic device 1 by virtue of their manner of deposition (using masks). When the base, emitter and collector regions are diffused into layer 4, masks are used to align and determine the shape and position of each region with respect to the others. Each mask is provided with alignment marks, so that later masks can be aligned with each previous deposition or diffusion. In this technique, an operator looks through a microscope and adjusts the position of the mask so that the alignment marks align with the previous alignment marks from the collector mask.

Figure 4:
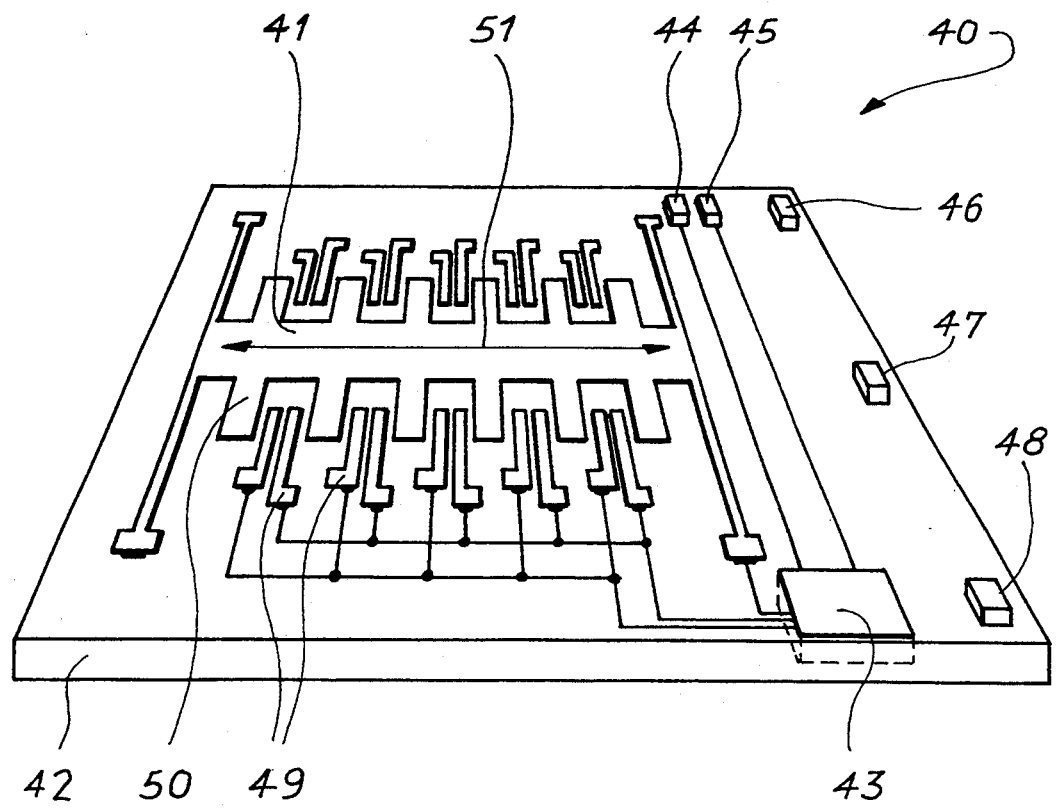
FIG. 4 is a schematic perspective view of a microelectronic device for use as part of an accelerometer, being one embodiment of a microelectronic device according to the present invention.

With reference now to FIG. 4, there is shown in schematic form only microelectronic device 40 for use as part of an accelerometer, comprising principally acceleration sensing element 41, substrate 42, signal conditioning circuitry 43 and gold bumps 44-48. It is to be appreciated that the relative size and arrangement of the various elements of represented in all the drawings is not to be considered, these elements merely being depicted as such for clarity of explanation.

Figure 5:
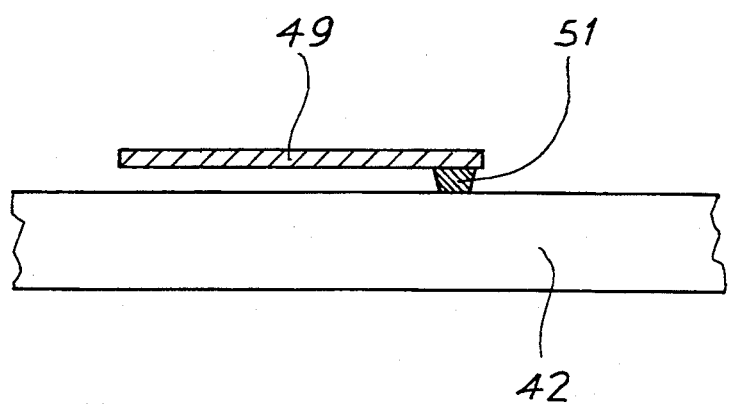
FIG. 5 is a digrammatic cross-sectional view of a portion of the accelerometer of FIG. 4.

Acceleration sensing element 41 consists of variable, differential, air capacitor having plates 49 cut (etched) from a single 2 $\mu$m thick slab of polysilicon film, according to know surface-micromachining techniques. Fixed capacitor plates 49 are realized as cantilever beams supported 1 $\mu$m above substrate 42 by polysilicon anchors 51, as shown in FIG. 5. Acceleration sensing element 41 moves relative to substrate 42 when an acceleration force is sensed. Moveable plates 50 are formed by fingers of acceleration sensing element 41, which is supported from substrate 42 in a similar manner to fixed capacitor plates 49. When no acceleration force is present, each of moveable plates 50 are positioned mid-way between a pair of fixed plates 49. When an acceleration force is sensed, moveable plate 50 moves towards one of the pair of plates 49 and away from the other, resulting in unequal capacitance between each of the pair of plates 49 and moveable plate 50. Signal conditioning circuitry 43, which is integrated into substrate 42, converts this change in capacitance to electrical signals. Gold bumps 44 and 45 are deposited on aluminium contacts (not shown) in a manner such as has been previously described, in order to the allow electrical connection of microelectronic device 40 to external circuitry. In order to accurately align sensitive axis 51 of accelerometer 40 with an expected acceleration axis, gold alignment bumps 46, 47 and 48 are deposited on substrate 42.

As will be well appreciated, gold bumps 46, 47 and 48 are deposited according to the same technique as described previously and, thus are aligned and in a predetermined relationship with sensitive axis 51.

Figure 6:
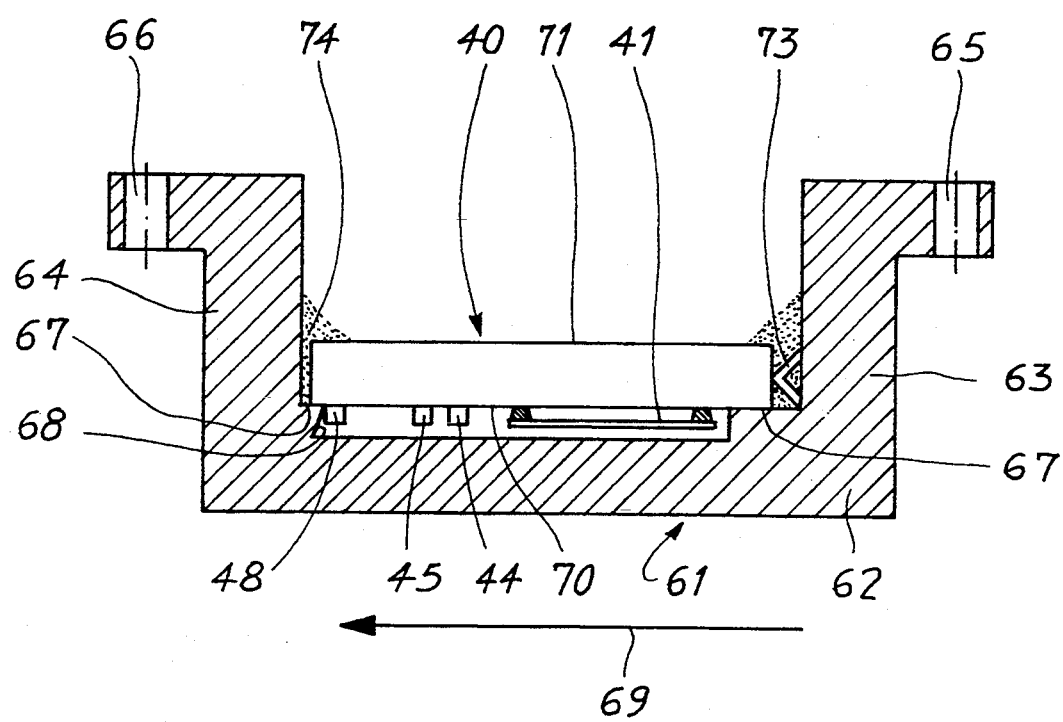
FIG. 6 is diagrammatic cross-sectional view of a mounting assembly and microelectronic device (of FIG. 4) of the present invention.

Referring now to FIG. 6, microelectronic device 40 (of FIG. 4) is shown mounted in mounting assembly 61.

Mounting assembly 61 comprises support member 62 and mounting arms 63 and 64, having associated affixation bores 65 and 66. Mounting assembly 61 may nevertheless be affixed to a base by any appropriate means.

Support member 62 provides reference surface 67, and abutment surface 68 for engagement with alignment bumps 46, 47 (not shown) and 48.

Abutment surface 68 run in a plane perpendicular to the plane of FIG. 6, and mounting assembly 61 may be affixed to a base so that abutment surface 68 is perpendicular to expected acceleration axis 69.

In order to mount microelectronic device 40 in mounting assembly 61, and thereby align the sensitive axis of acceleration sensing element 41 with expected acceleration axis 69, microelectronic device 40 is introduced into mounting assembly 61, face 70 of microelectronic device 40 engaging reference surface 67. The face from which alignment bumps 46, 48 project is utilised in this embodiment of the invention in order that the abutment surface 68 may be caused to engage with alignment bumps 46, 48; the opposing face 71 of microelectronic device 40 may not be used in this particular embodiment because the dimensional tolerance between faces 70 and 71 in manufacture is the same magnitude as the height of alignment bumps 46, 48 ($\approx 25$ $\mu$m).

The engagement of face 70 with reference surface 67 therefore provides a reference plane from which the position of alignment bumps 46, 48 may be anticipated. It is to be appreciated however, that other arrangements not requiring such engagement are possible.

Alignment bumps 46, 48 are subsequently brought into engagement with abutment surface 68 by a sliding movement between face 70 and reference surface 67. In the embodiment shown in FIG. 6, alignment bumps 46, 48 engage abutment surface 68 at the connection thereof to reference surface 67; however it is to be appreciated that other arrangements are equally possible.

Mounting assembly 61 may also include biasing spring 73 for biasing alignment bumps 46, 48 towards abutment surface 68. Biasing means may, in addition to or as an alternative to, be included in mounting assembly 61 to bias face 70 towards reference surface 67. In order to further secure the thus mounted microelectronic device 40, adhesive means 74, such as a stable epoxy or urethane adhesive, may be applied between microelectronic device 40 and mounting assembly 61.

Finally, it is to be understood that various modifications and/or additions may be made to the microelectronic device and means for positioning same withouth departing from the ambit of the present invention as defined in the claims appended hereto.

We claim:

1. Microelectronic device responsive to an external force and comprising a body (42) and alignment means (46, 47, 48) projecting from one face of said body (42) for abutment and positioning of said microelectronic device with a support member (62), said body (42) including an electrically active region (41) having a sensitive axis (51) along which said microelectronic device is most sensitive to changes in said external force, characterised in that said alignment means (46, 47, 48) has a predetermined orientation with respect to said sensitive axis (51) for enabling the alignment of said sensitive axis (51) with an expected direction of said external force.

2. Microelectronic device according to claim 1, characterised in that said alignment means (46, 47, 48) are deposited onto said one face.

3. Microelectronic device according to either of claims 1 or 2, characterised in that said alignment means (46, 47, 48) are aligned with said sensitive axis (51) by depositing said alignment means on said one face using a mask having a predetermined orientation with respect to said sensitive axis (51) for fixing the position of said alignment means (46, 47, 48) relative to said sensitive axis.

4. Microelectronic device according to claim 1, characterised in that said alignment means (46, 47, 48) comprises a plurality of alignment elements projecting from said one face.

5. Microelectronic device according to claim 3, further comprising contact means (44, 45) deposited onto said one face to provide electrical contact to said electrically active region (41).

6. Microelectronic device according to claim 4, characterised in that said alignment elements (46, 47, 48) consist primarily of gold.

7. Microelectronic device according to claim 6, characterised in that said alignment elements (46, 47, 48) have a height of less than 30 μm.

8. Mounting assembly for use with one or more microelectronic devices according to claim 1, said mounting assembly including said support member (62), characterised in that said support member (62) includes a reference surface (67) for engagement with said one face of said body (42), and a first abutment surface (68) for engagement with said alignment means (46, 47, 48) so as to prevent movement of said one face in a first direction along said reference surface.

9. Mounting assembly according to claim 8, characterised in that said support member (62) further includes a second abutment surface for engagement with said alignment means (46, 47, 48) so as to prevent movement of said one face in a second direction along said reference surface (67).

10. Mounting assembly according to claim 8, characterised in that said engagement of said reference surface (67) and said one face of said body (42) is such as to enable slidable contact therebetween, said abutment surfaces being brought into engagement with at least one of said alignment means (46, 47, 48) by relative sliding movement between said reference surface (62) and said one face of said body (42).

11. Mounting assembly according to claim 8, characterised in that said mounting assembly further comprising first biasing means (73) for biasing said one or more microelectronic devices against said reference surface (67).

12. Mounting assembly according to claim 8, characterised in that said mounting assembly further comprises means (74) to securely engage said one or more microelectronic devices to said support member (62) after the abutment of said one or more microelectronic devices to said support member (62).

13. Mounting assembly according to claim 12, characterised in that said means (74) for securely engaging said one or more microelectronic devices to said support member comprise adhesive means applied between said one or more microelectronic devices and said support member.

* * * * *